Patented Sept. 12, 1922.

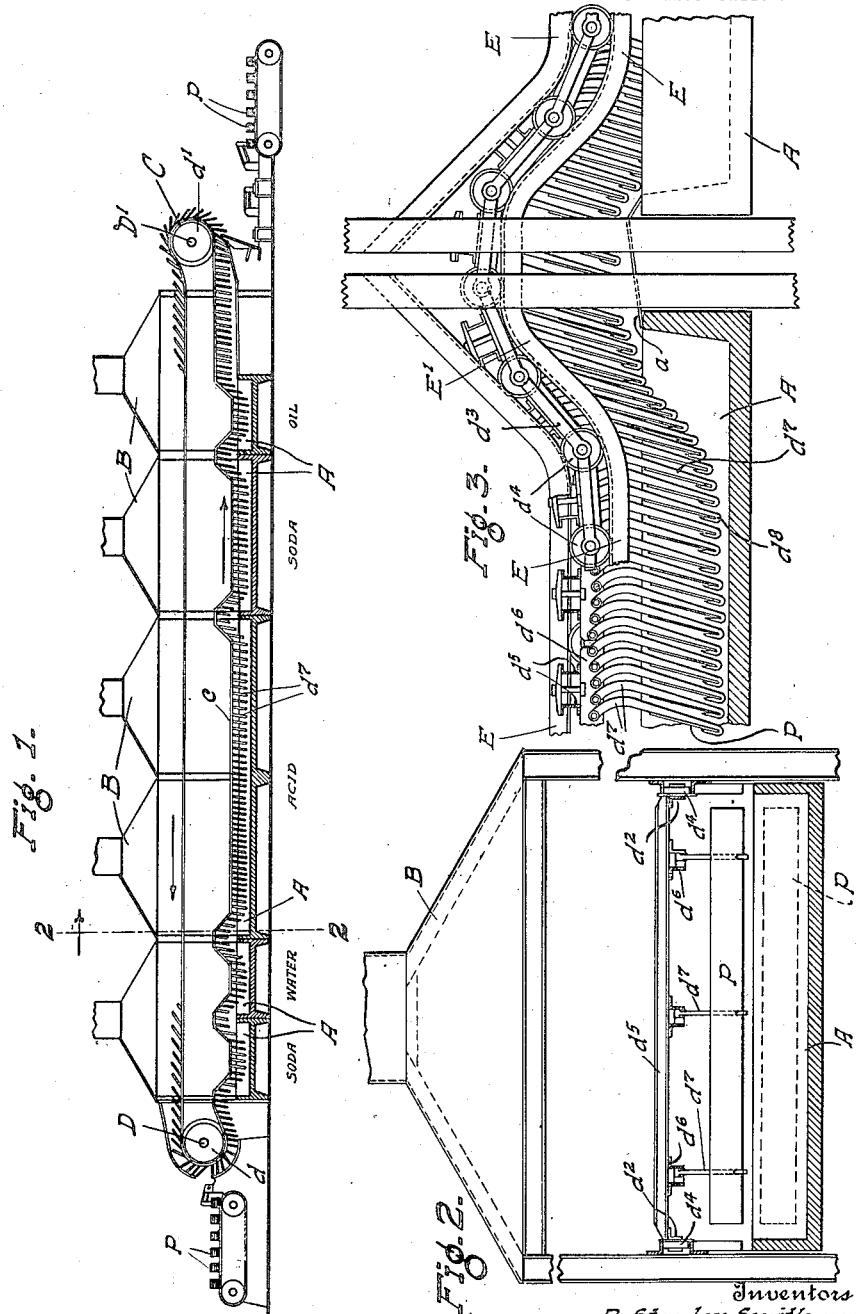

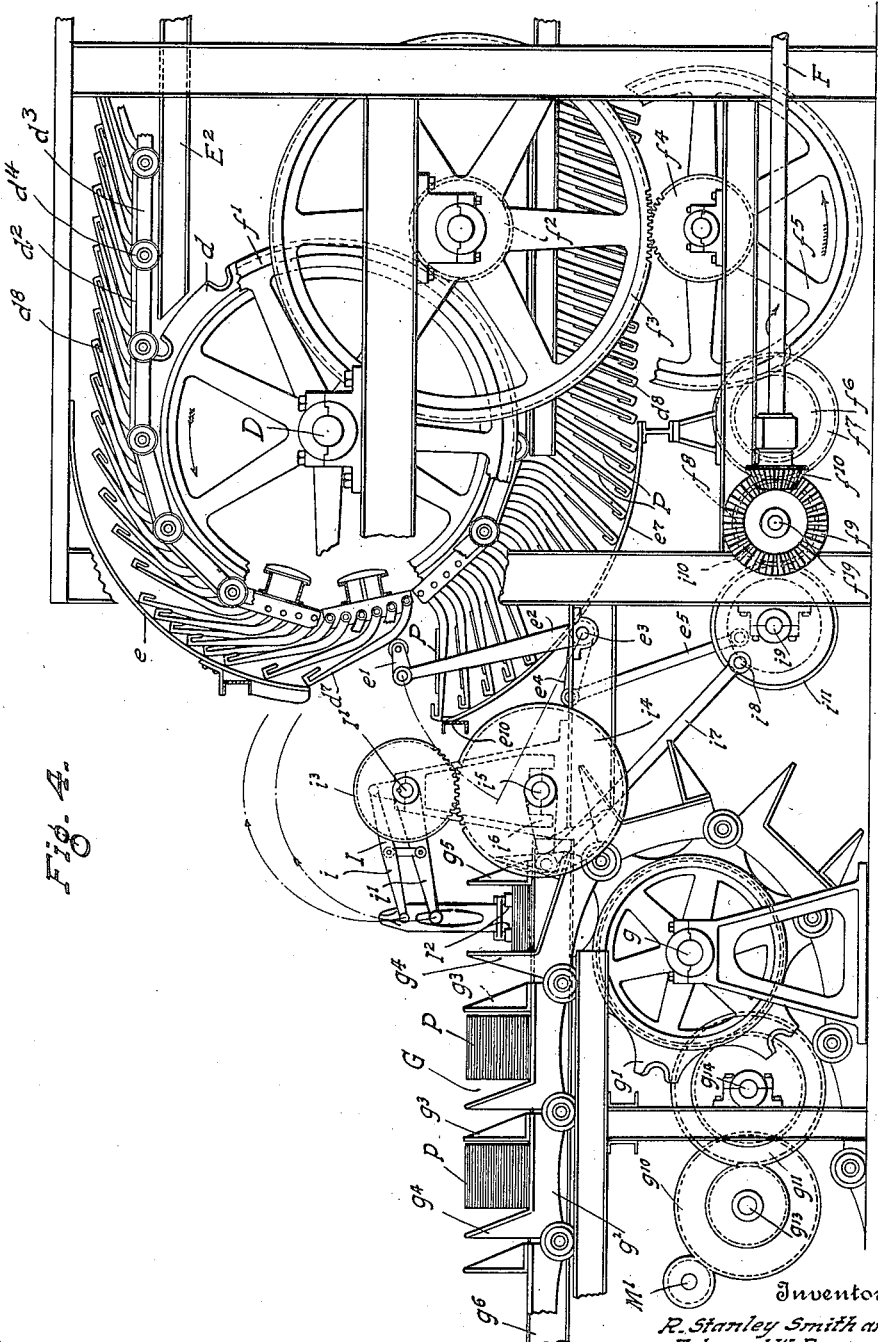

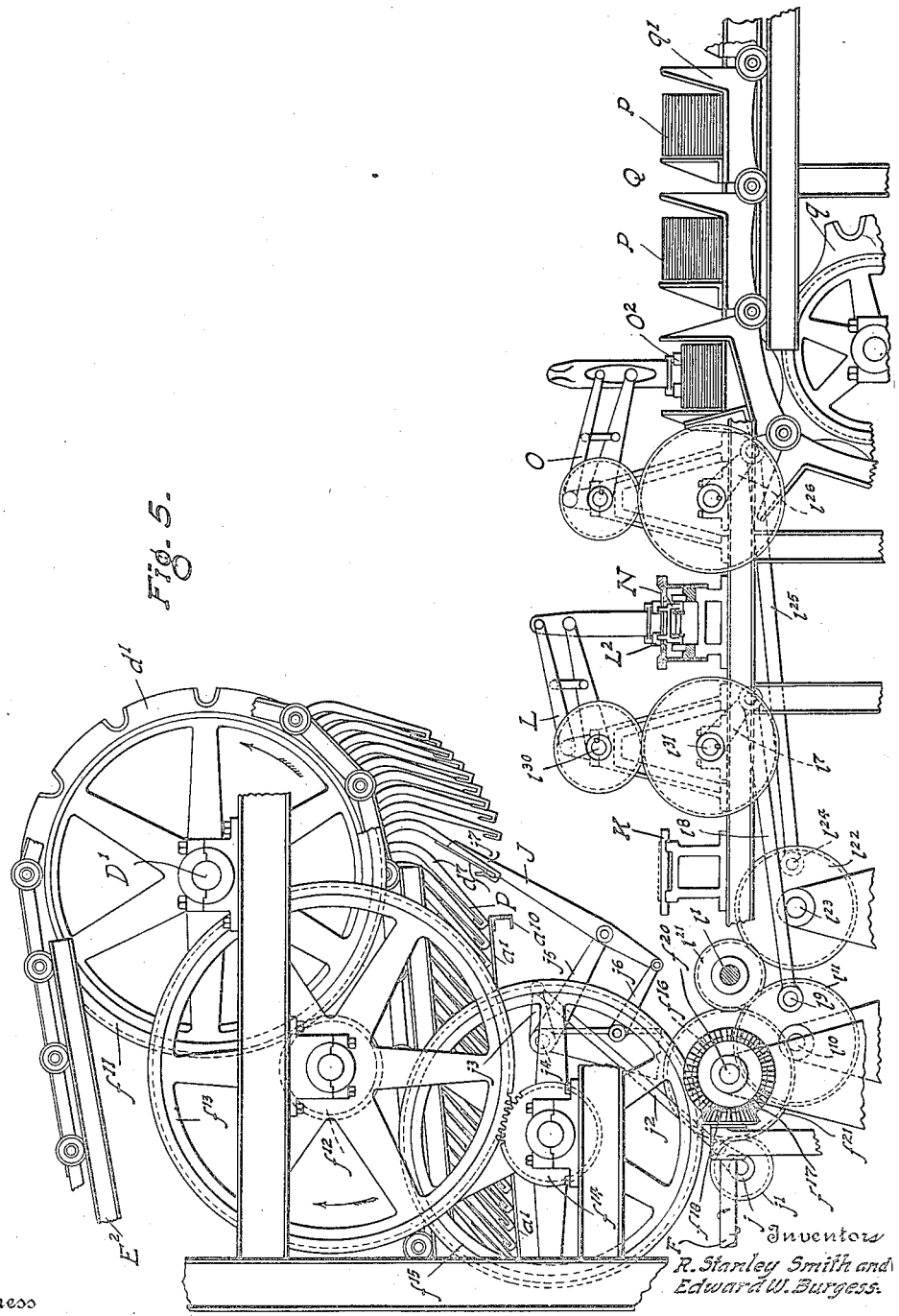

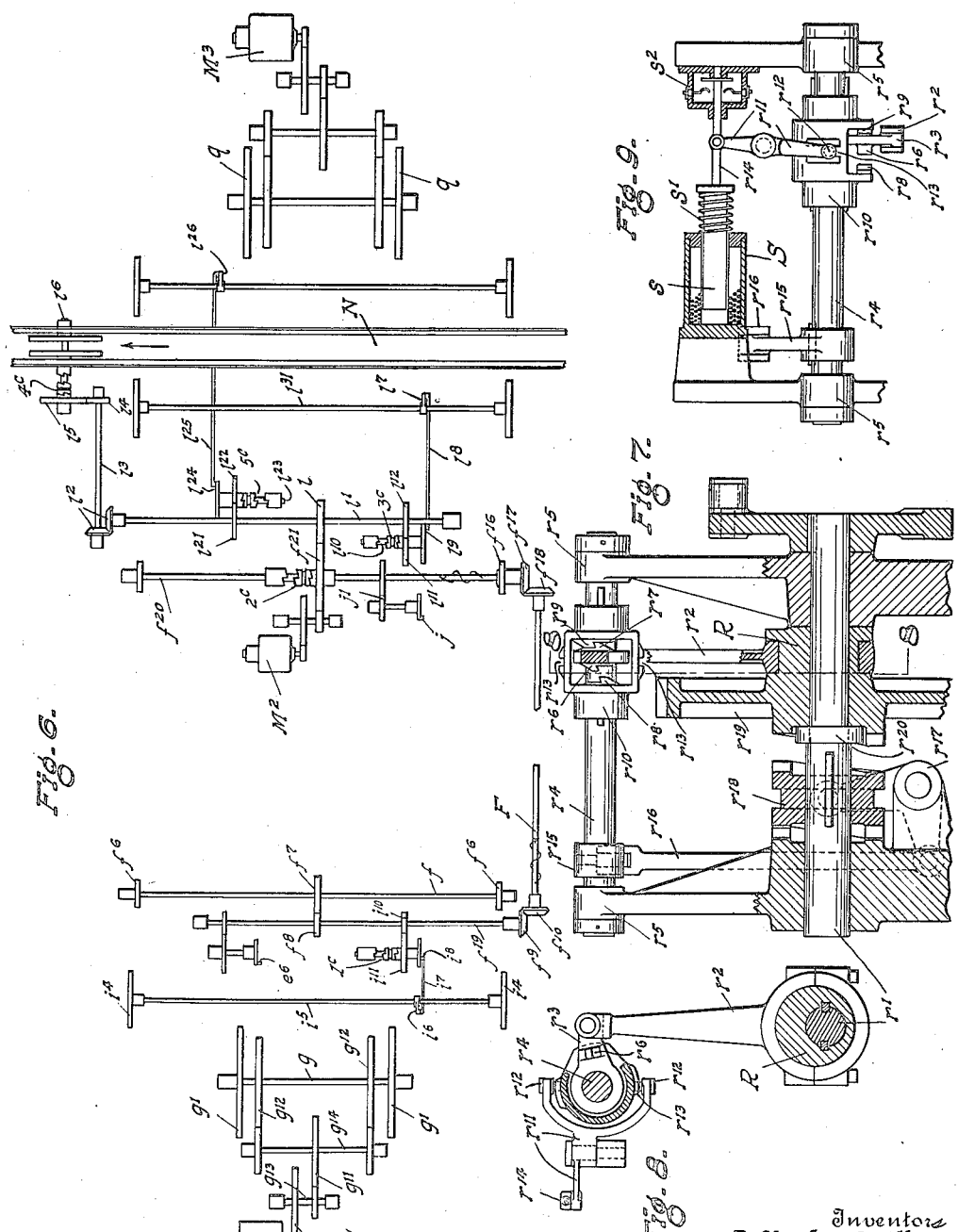

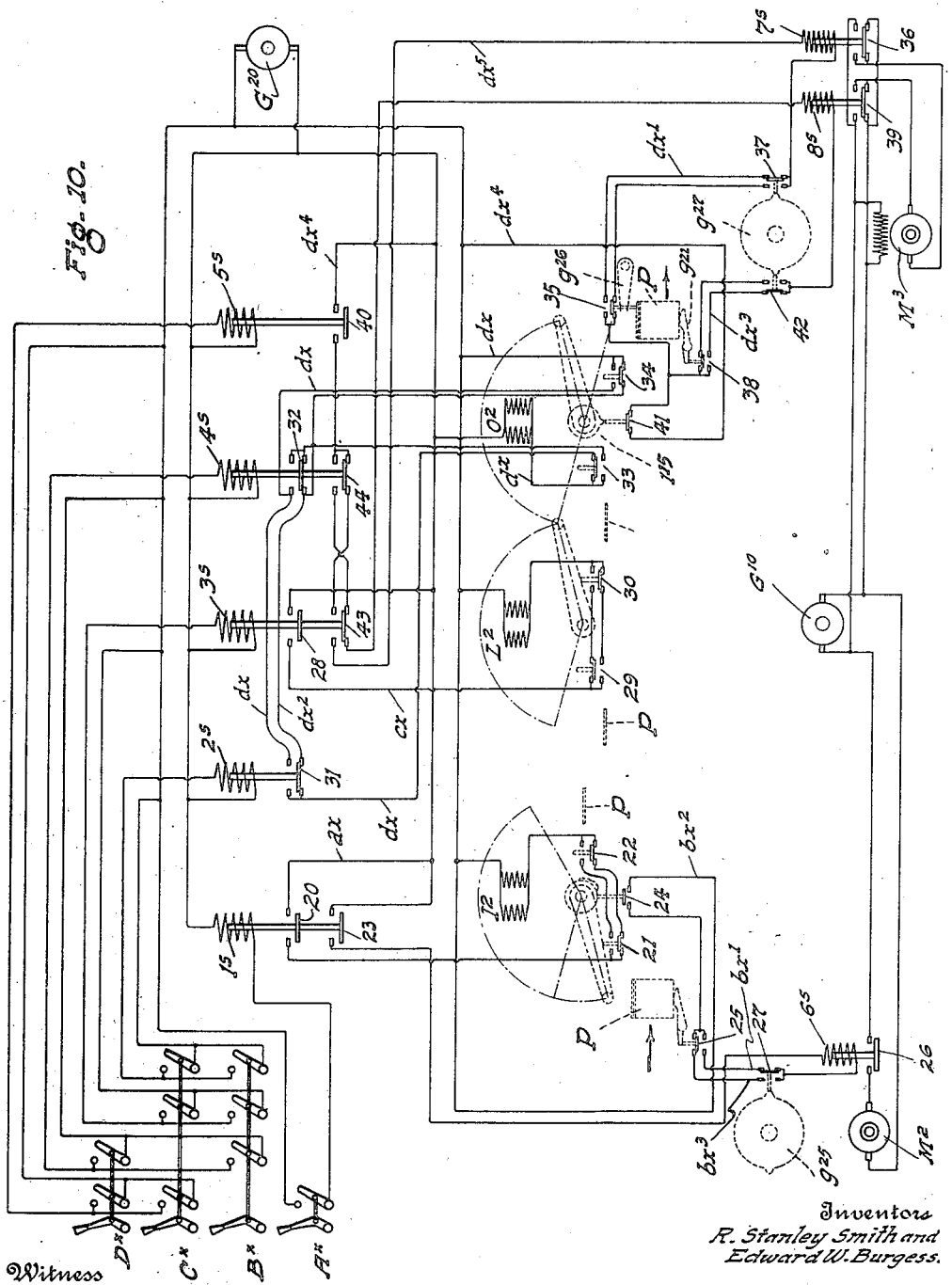

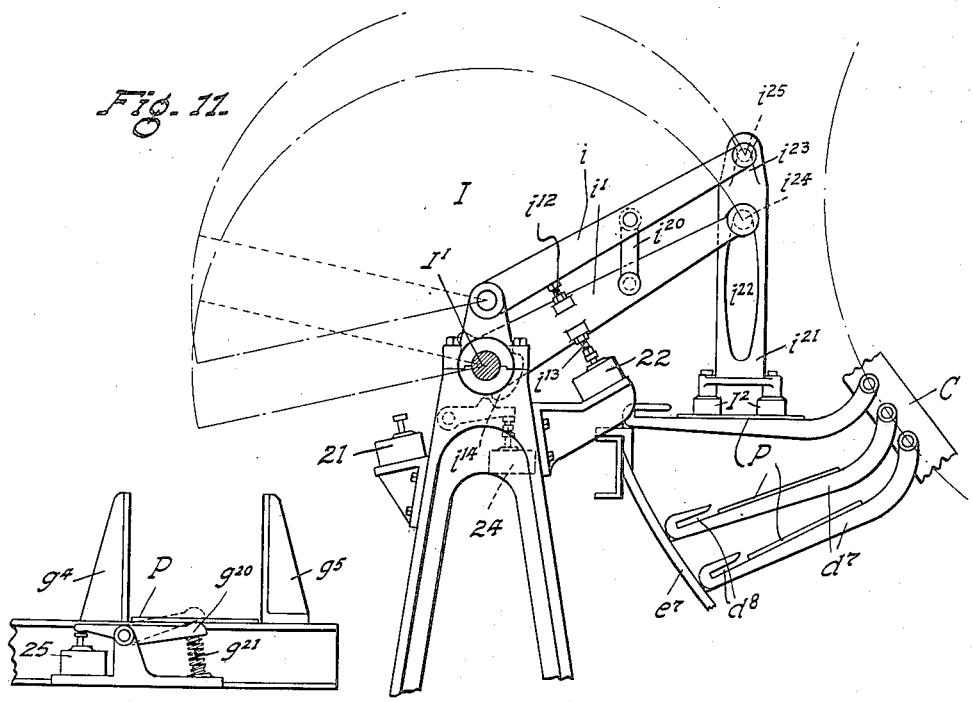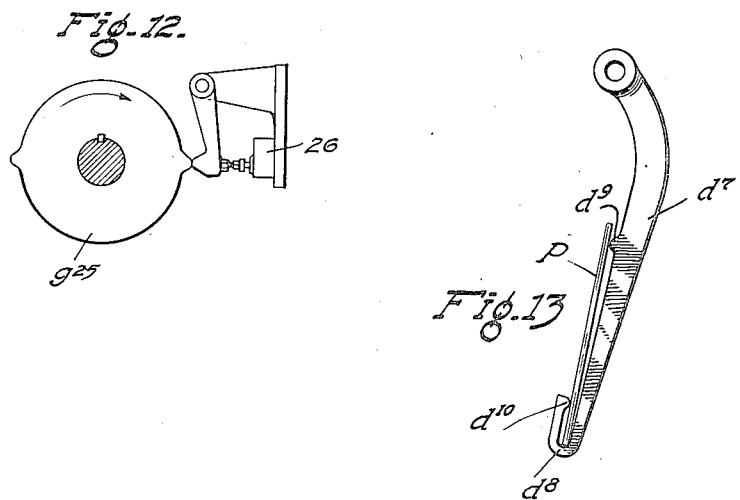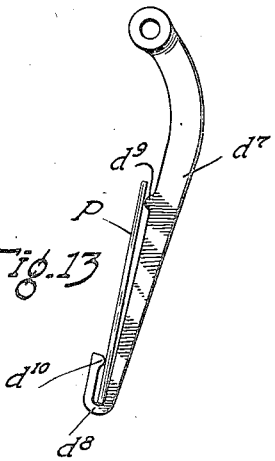

1,428,716

UNITED STATES PATENT OFFICE.

REUBEN STANLEY SMITH AND EDWARD W. BURGESS, OF MILWAUKEE, WISCONSIN, ASSIGNORS TO A. O. SMITH CORPORATION, OF MILWAUKEE, WISCONSIN, A CORPORATION OF NEW YORK.

MACHINE FOR PICKLING METAL PLATES AND BLANKS.

Application filed February 2, 1920. Serial No. 355,727.

*To all whom it may concern:*

Be it known that we, REUBEN STANLEY SMITH and EDWARD WESLEY BURGESS, citizens of the United States, residing in the city of Milwaukee, in the county of Milwaukee and State of Wisconsin, have invented a certain new and useful Improvement in Machines for Pickling Metal Plates and Blanks (Case #124), and do declare the following specification to be a full, clear, and exact description thereof, such as will enable persons skilled in the art to which the invention pertains to make and use the same, reference being had to the accompanying drawings for disclosure as to the construction of the apparatus.

The invention relates to a machine for pickling sheet metal plates or blanks, it being the purpose of the pickling operation to clear such plates or blanks from scale or other substances which may be injurious to the tools of the machines or presses which are used in shearing, punching, drawing or otherwise treating the plates or blanks made therefrom in the subsequent manufacturing operations.

The invention comprises a construction by which the metal plates or blanks to be pickled are automatically supplied to an endless conveyor, which latter in its travel carries such plates or blanks into and out of the several baths used in the pickling process, and at the completion of the desired treatment, delivers the plates or blanks at a point in position for removal from the conveyor by an automatically operated unloading mechanism.

The purpose of the invention is the provision of mechanical apparatus for effecting an operation heretofore performed by hand, and by the use of such apparatus, we are enabled to overcome the disagreeable results incident to the personal contact of the workmen with the acid baths and the coated plates or blanks, as the latter are withdrawn from the baths.

The invention is embodied in a structure in which the several baths or vats containing the several chemical solutions are arranged in succession, so that endless chain conveyors may be employed to carry the plates or blanks from one bath to another, until such plates have received the desired treatment by immersion in all of the baths.

The construction and arrangement is such that in the operation of the mechanism, the metal hooks which carry the plates or blanks are the only parts of the apparatus, aside from the containing vats, which are subject to contact with the chemicals. These hooks are formed from a metal which will enable them to resist the action of the acids, and the conveyor chains from which the hooks are suspended, are supported and guided in a line of travel which is clear of the vats or baths. By this construction and arrangement, the injurious effects of the acids upon the apparatus is avoided.

Feeding devices have been provided which take the plates or blanks from stacks and lay them singly upon the hooks of the conveyor chains, so that the plates or blanks may be run through the baths. After treatment for the required length of time, the plates or blanks are delivered at the other end of the apparatus to a cross-conveyor, by means of which they are fed to a line of machines by which they are successively subjected to manufacturing operations.

The machines of such line are operated at a rate of speed which is synchronous with the delivery of the blanks or plates from the pickling apparatus. But when the time arrives for shutting down the operation of the machines, the movement of the plates then in transit through the pickling vats must continue until all of such plates have been delivered from the vats. This is necessary in order that injury to the plates by reason of too long a contact with the acids may be avoided. To take care of the plates which emerge from the pickling vats after the machines of the line have ceased to operate, we provide an auxiliary storage device upon which the plates are stored instead of being fed to the line of machines by the cross-conveyor before referred to.

This storage device is designed to receive the plates delivered from the pickling vats after the machines of the line have ceased their operation, and also to transfer such plates back to the cross conveyor upon resumption of the operation of the machines. When all of the stored plates have been taken from the storage device, a new supply of plates fresh from the pickling vats will be ready to be fed by the cross conveyor to the machines of the line, it being understood that at the time of beginning to feed the plates from the storage device, the feeding of plates into the vats for the purpose of pickling is also commenced, so that the first procession of plates from the storage device is followed by the second from the pickling vats, without interruption or loss of time.

All of the various transferring and feeding devices operate automatically, and provisions have been made for their operation in any desired order of movement or combination of movements, which may arise in the operation of the pickling apparatus.

The machine embodying this our present invention is designed to form an element of the assemblage of machines disclosed in application Serial No. 212,934, filed Jan. 21, 1918, by R. Stanley Smith and patented November 15, 1921, #1,397,020, such assemblage including machines which by their related and successive operations, punch from metal sheets the side and cross bar and other blanks used in constructing an automobile or other vehicle frame, shape such blanks according to the particular requirements relating to each, perform the necessary milling operations thereon, assemble the several constituent parts, and securely fasten all of such parts together in their respective positions by means of rivets, so that in a continuous operation of mechanical devices a completed automobile or other vehicle frame is automatically produced.

The features of the endless conveyor with the depending hangers for supporting the plates, and the means for effecting the undulatory movement of the conveyor during the pickling operation, as herein disclosed, are the separate invention of Mr. Burgess, one of the parties hereto, and are the subject-matter of the claims of an application filed March 30, 1922, Serial No. 548,268.

The features which constitute our present invention, will be defined in the claims appended hereto.

Referring to the drawings accompanying this specification:

Figure 1 is a view in elevation showing in conventional manner the course of the main plate conveyor through the pickling machine, and indicating the relative positions of the loading mechanism at one end and the unloading mechanism at the other end of the machine.

Fig. 2 is a view in vertical cross section on the line 2—2, Fig. 1, in a plane intersecting the path of travel of the conveyor, showing one of the carriers of the conveyor with a metal plate in position thereon for treatment.

Fig. 3 is a fragmentary view of the conveyor, and showing the arrangement of the cams whereby the carriers for the plates are raised out of one bath preparatory to their immersion in another.

Fig. 4 is an enlarged view of the left hand end of the machine, and showing the loading mechanism and devices for transferring and loading the metal plates onto the main conveyor.

Fig. 5 is a like view of the right hand end of the machine, and showing the unloading mechanism and devices for unloading and transferring the plates from the main conveyor.

Fig. 6 shows diagrammatically in a plan view the arrangement of the driving devices for the loading mechanism, the main conveyor for the metal plates, and the unloading mechanism.

Figs. 7, 8 and 9 show details of the construction and arrangement of the typical clutch and its operating means employed in the machine, Fig. 8 being a view on the line 8—8, Fig. 7, and Figs. 7 and 9 being partly sectional.

Figure 10 is a diagram of the wiring system of the machine, by which the operation of the latter is controlled.

Fig. 11 is an enlarged view showing the movements of the front transfer hoist for the feeding conveyor in loading a plate onto the main conveyor.

Fig. 12 is a detail view of a cam and switch constituting a circuit maker in the machine.

Fig. 13 is a detail view showing the hook of special form which is employed to support to metal plate while being conveyed through the pickling apparatus.

In the drawings, Fig. 1, we have shown a series of vats or baths A, for containing the several liquid compositions, such as soda, water, acid, soda and oil, in the order named in the present instance, and into which vats the plates or blanks carried by the endless main conveyor C, are dipped during the passage of the latter through the machine. The vats are arranged in the line of travel of the main conveyor, which having been supplied with plates or blanks to be pickled, is operated to submerge such plates or blanks in each of the vats in succession. The vats are enclosed by a series of ventilated housings B, provided upon two opposite sides with openings, whereby a longitudinal passage is formed for the movement of the endless main conveyor C, which, in the present embodiment of our invention, moves continuously.

Supported by the frame at the front or loading end of the machine, Fig. 4, is a shaft D, upon which are mounted sprocket wheels $d$, and at the rear or unloading end, Fig. 5, is a like shaft $D^1$, upon which are mounted sprocket wheels $d^1$. The endless main conveyor C is formed as a chain or belt $c$, which passes about and is supported and directed in its course by the sprocket wheels $d$, $d^1$. The two chains of the conveyor are composed of pairs of links, $d^2$, $d^3$, which receive between their ends the pivoted supporting and guiding rollers $d^4$. The inside links $d^2$, of each chain support cross bars $d^5$, to which are attached a series of hangers $d^6$, from each of which depends a plurality of pivoted hooks $d^7$, which receive and support the plates P, while the latter are being subjected to the pickling operation.

Parallel guiding tracks E, for the rollers $d^4$ of the conveyor, are attached to the frame of the apparatus. At points where the plates P are to be lifted out of one vat for immersion in another, or for unloading, these tracks are provided with elevating runways or undulations $E^1$, over which the rollers move, in the manner indicated in Fig. 3. In their return movement, the rollers $d^4$ pass over upper, plain track sections $E^2$. The tracks, it will be observed, lie in a plane which is above the top of the vats, so that no part of the apparatus, excepting the hooks $d^7$, is brought into contact with the acids. The upper and lower runs of the endless conveyor are in normal planes which are parallel or substantially so, the provision of the undulations in the lower track serving to divert the conveyor from its normal path of movement, in order to permit the articles carried thereby to be immersed in the solutions in the containing vats or tanks.

A shaft F, extending longitudinally of the apparatus, couples indirectly the shaft D and sprocket wheels $d$, with shaft $D^1$ and sprocket wheels $d^1$, so that these parts operate in unison. The sprocket wheels $d$ are driven from the shaft F, through the train of connecting gears $f^1$ to $f^8$, shaft $f^{19}$ and the bevel gears $f^9$ and $f^{10}$, the latter bevel gear being keyed to the front end of the said shaft F, all as indicated in Fig. 4. The sprocket wheels $d^1$ are driven from the shaft F, through the train of connecting gears $f^{11}$ to $f^{16}$, and the bevel gears $f^{17}$ and $f^{18}$, the latter bevel gear being keyed to the rear end of the said shaft F, all as indicated in Fig. 5. The bevel gears $f^9$ and $f^{17}$ are keyed upon parallel shafts $f^{19}$ and $f^{20}$, respectively. A motor $M^2$, is employed to drive the shaft $f^{20}$, through the gearing shown in Fig. 6, and the gear $f^{21}$, the latter rotating loosely upon the shaft but adapted to be connected therewith so as to rotate the said shaft through the operation of clutch $2^c$. By the means described, the conveyor C is actuated to carry the metal plates or blanks through the pickling vats, the reducing gearing employed in the several connections shown retarding the movement of the conveyor, so that sufficient time is allowed for the chemicals to act upon the plates or blanks while in the vats.

The hook $d^7$ will be made of bronze, or of other metal so coated as to resist the destructive action of the chemical solutions employed in pickling. The vats A may be provided with a lining of lead, if desirable. Dripping plates $a$, covering the space between contiguous vats, are arranged at an angle, as shown in Fig. 3, so that the unabsorbed chemicals coating the metal plates upon removal from the vats will drip and flow back into the vats from which the plates have just been lifted. This arrangement will tend in a material degree to the conservation of the chemicals.

The plates or blanks to be pickled are automatically fed to the conveyor C, and this result is effected by means of a loading mechanism G, at the front of the apparatus. Shafts $g$, carrying sprocket wheels $g^1$, are mounted in the frame of the loading mechanism. About these sprocket wheels an endless loading carrier $g^2$ travels, the said loading carrier moving along the top of the frame, and supporting the plates or blanks in position to be taken by the transferring devices, to be described later, and placed upon the hooks $d^7$, of the conveyor C, by which they are immersed in the several vats during the travel of the said conveyor. Each link of the chain carrier $g^2$ is provided with two standards $g^3$, $g^4$, between which the metal plates P are stacked, with their front edges against the faces of the standards $g^3$, which are normal to the line of travel of the carrier. The faces of the standards $g^4$ are inclined, so as to facilitate placing the plates between the standards. Stops $g^5$, corresponding to the standards $g^3$, are fixed to bars $g^6$, on the frame. As the sprocket wheels $g^1$ move the carrier and its stack of plates P, against the stops $g^5$, on the bars $g^6$, the chain links, upon which the said stack was carried, start on their passage around the sprocket wheels, and by being withdrawn into a lower plane cease to support the plates, which now rest on the bars $g^6$. During this movement, the inclined faces of the standards $g^4$ are brought into contact with the rear edges of the plates P of the stack nearest the pickling machine, and by crowding any plates which may be out of alignment, all of the plates in the stack are held accurately in position for transfer to the conveyor C, the loading carrier $g^2$, having in the meantime come to a position of rest, which it maintains during the transfer of the plates singly from the stack.

The loading carrier $g^2$ is actuated by a motor $M^1$, through a train of reducing gears $g^{10}$, $g^{11}$ and $g^{12}$, see Fig. 6, and shafts $g^{13}$ and $g^{14}$, which drive the shaft $g$, which latter carries the sprocket wheels $g^1$. A device consisting of a spring-pressed feeler finger $g^{20}$, is employed to control the time of operation of the motor $M^1$. This feeler finger is arranged with one end under the stack of plates, and as long as there remains in the stack a plate to be transferred, the feeler finger will be depressed against the opposition of its actuating spring, see Fig. 11. When released by the removal of the bottom plate in the stack, the feeler finger will be actuated to close the switch 25, and thus, in co-operation with connections hereinafter described, close the circuit of the motor $M^1$. Whereupon, the loading carrier will be moved to present a second stack of plates to the conveyor, for repetition of the operation, the contact at switch 25, being broken by the movement of the stack of plates into position for transfer, and the motor $M^1$ being stopped for the time being. In so moving into position, the successive stacks of plates will slide over and depress the feeler finger, $g^{20}$, compressing the actuating spring $g^{21}$ of the latter.

An electro-magnetic transferring device I having a movement of rotation toward the endless conveyor, is employed for transferring the plates P, one at a time, from the stack presented by the loading carrier $g^2$ to the conveyor C. The oscillating power shaft $I^1$, of the transferring device is journalled in bearings on the frame, and provided with arms $i^1$, which at their free ends are connected to electro-magnets $I^2$. Oscillating levers $i$, pivoted to the frame, are likewise attached to the electro-magnets, and the levers $i$ and arms $i^1$ are so connected as to give a parallel motion to the magnets in their reciprocatory movements through an arcuate path in transferring the plates from the stack to the conveyor C. A gear $i^3$, on the shaft $I^1$, is engaged by a gear $i^4$, on the shaft $i^5$, to which latter a crank arm $i^6$ is connected. A link $i^7$ connects the crank $i^6$ with a crank $i^8$, on the shaft $i^9$, the latter being actuated from shaft $f^{19}$, by intermeshing gears $i^{10}$ and $i^{11}$, the latter being loose upon the shaft $i^9$, but adapted to be coupled thereto by clutch $1^c$. The engagement of clutch $1^c$ with gear $i^{11}$, by the devices hereinafter described, will serve to move the electro-magnets $I^2$, to transfer the plates from the stack presented by the loading carrier to the conveyor C, during the movement of the conveyor.

In their return movement over the upper track $E^2$, the pivoted hooks $d^7$ fall upon the conveyor, and are held in this retracted position in relation to the sprocket wheels $d$, by a curved guard $e$, arranged concentrically with the said sprocket wheels $d$, until permitted to escape therefrom by passing away from the lower end of the guard. An escapement $e^1$ then receives the series of hooks for each plate and lowers such hooks into horizontal position for the transfer of a plate from the stack presented by the loading carrier. This escapement is supported by arms $e^2$, fixed to an oscillating shaft $e^3$, to which is also attached an arm $e^4$, in turn connected by a link $e^5$ to a crank $e^6$, driven by gears from the shaft $f^{19}$, Figs. 4 and 6. As the escapement is vibrated away from the position in which it supports the leading series of hooks $d^7$, such hooks, having previously cleared the lower end of the guard $e$, will be permitted by the outward movement of the vibrator to fall into the horizontal position shown in Fig. 4, in which position the hooks will receive a plate P, through the action of the electro-magnetic transferring devices. At such time, the face ends of the hooks of the leading carrier will rest upon a bar $e^{10}$. At about the time the hooks reach their horizontal position, the escapement passes beyond the free ends thereof, and is returned by the further rotation of the crank $e^6$, to engage and support the series of hooks next following, when released from the guard $e$, and at the same time maintain a clear space for the travel of the electro-magnetic transferring device, in depositing a plate upon the hooks.

A correspondingly shaped guard or guide $e^7$, the upper edge of which is attached to the bar $e^{10}$, is arranged at the lower side of the sprocket wheels $d$, for guiding the hooks after they have been loaded with plates. As the hooks are carried along this guide, and assume their pendant positions, the plates laid thereon will slide down so as to rest in the contracted necks $d^8$, of the hooks, by means of which the plates will be retained until removed by the unloading devices at the other end of the pickling machine.

The arc through which the levers $i$ and arms $i^1$ move is constant, but the extent of the movement of the electromagnets $I^2$ is varying, and in accordance with the diminishing number of plates in the stack being fed to the conveyor. A link $i^{20}$ connects the lever $i$ and arm $i^1$, of each pair, so that the two parts are parallel in all positions. The magnet carrier $i^{21}$ is slotted at $i^{22}$, for the reception of and in which a guiding and lifting pin $i^{24}$, in the end of arm $i^1$ may move, and a guiding groove $i^{23}$ is formed in the end of the carrier $i^{21}$, for the reception of and in which a guiding pin $i^{25}$, in the end of lever $i$, may move. The provision of these lost motion features in the construction will compensate for the variable distances traveled by the electro-magnets in picking the metal plates P in succession from the stack, the magnet carrier having a free, sliding movement over the pins in the arm and lever, as described, and as indicated by the broken parallel lines at the left in Fig. 11. In the travel from side to side, the weight of the electro-magnet structure causes the contracted upper ends of the slot $i^{22}$ and of the groove $i^{23}$, to embrace the pins $i^{24}$ and $i^{25}$, and hold the magnet carriers in vertical position. It will be observed that the sides of the slots and grooves referred to are curved, as shown in Fig. 11. The purpose of this construction is to permit the arms $i$ and $i^1$, to continue their movement after the electro-magnets encounter the stack of plates P, without disturbing the vertical position of the magnet carriers, a clearance for the free movement of the pins $i^{24}$ and $i^{25}$, being provided by the curved construction described.

Upon being lifted from the last of the vats of the pickling machine, the hooks $d^7$, carrying the plates P, are dragged over an extended dripping plate $a^1$, the outer edge of which rests upon the bar $a^{10}$, and which is so arranged that the space between the conveyor C and the said dripping plate is contracted, with the result that the hooks are turned on their pivots into the position indicated in Fig. 5. This movement provides a separation of the plates P at the point where they pass from the dripping plate $a^1$, to permit the action of the devices which unload the said plates P, singly, from the conveyor. A crank $j$ is geared at $j^1$ to the shaft $f^{20}$, Figs. 5 and 6, and is connected by a link $j^2$, to an arm $j^3$, fixed on oscillating shaft $j^4$, journalled in the frame. Fixed also upon the shaft $j^4$, are levers $j^5$ connected at their free ends at an intermediate point to the unloading arms J, forked or fingered at $j^7$, for the reception of a plate P, when the latter is presented by the conveyor C, in position to be unloaded. Links $j^6$, pivoted at one end to the frame and at the other to the lower ends of the arms J, serve to direct the forked or fingered ends of the arms into their proper path of movement during the operation, when the shaft $j^4$ is oscillated by the rotation of the crank $j$. The movement of the arms J is such that they are projected first into the space between the leading series of the hooks restrained by the plate $a^1$, and the hooks which have been freed. In such position, the arms will arrest the further movement of the plate and hooks, when the latter have passed from the plate $a^1$, and a further movement of the arms will disengage the plate P, from the hooks, which latter will be free to swing away from the plate P. The reverse throw of the crank $j$, will bring the arms J into a horizontal position, and deposit the plate P upon a series of transverse supports K, and from which it will be immediately removed by a transferring device, to be described presently, the further movement of the crank withdrawing the arms J from engagement with the plate P, and into a plane a little below that of the surface of the transverse supports. Following the removal of the plate from the said supports by the transferring device to be described, the arms J are elevated into position to receive another plate from the conveyor.

A cross-conveyor, indicated at N, Fig. 5, and which may be an endless carrier, or of other approved construction, is employed to convey the plates P from the pickling apparatus, and feed such plates to the other machines of the assembly, which by their successive but connected movements will subject the plates to the contemplated manufacturing operations. A gear $l$, fixed upon the shaft $l^1$, is engaged and driven by the gear $f^{21}$, on shaft $f^{20}$. Bevel gears $l^2$, Fig. 6, connect the shaft $l^1$ with the shaft $l^3$, and gears $l^4$ and $l^5$, transmit motion from the shaft $l^3$, to the shaft $l^6$, of the cross-conveyor. The gear $l^5$ is loose upon the shaft $l^6$, but is adapted to be coupled thereto by clutch $4^c$, to actuate the cross-conveyor, when necessary.

An electro-magnetic transferring device L, is employed to remove the plates P from the transverse supports K, and deposit such plates upon the cross-conveyor N. In construction and operation this reciprocatory transferring device is similar to the plate feeding device I, except that the connection between the magnet carrier and the shaft arms and lever is made at pivotally fixed points, there being in this operation no reason for any varying movement of the magnet carrier independently of the supporting arms and lever. The oscillating shaft $l^{30}$, upon which the lower set of arms is mounted, is actuated from shaft $l^{31}$, through intermeshing gears and a crank $l^7$, as are the parts $i^3$, $i^4$ and $i^5$, in Fig. 4. In Figs. 5 and 6, the crank $l^7$ is connected by a link $l^8$, to a second crank $l^9$, on a short shaft $l^{10}$, on which shaft a gear $l^{11}$ is mounted to rotate freely, but adapted to be coupled therewith by clutch $3^c$. The gear $l^{11}$ intermeshes with a gear $l^{12}$, fixed on the shaft $l^1$, which in turn is driven by the gear $l$, referred to in the preceding paragraph.

It is desired that the plates P be not permitted to remain in the acid baths beyond the time which has been determined as sufficient for the necessary chemical action upon such plates to take place, and it is essential, therefore, that the movement of the conveyor C, when commenced, shall continue until all of the plates P in transit through the vats of the pickling machine have been discharged therefrom. This contingency will arise when the hour comes for shutting down the operation of the machines of the assembly to which the pickled plates are fed by the cross-conveyor, and will arise also in the event of an interruption of the operation of such machines during working hours.

To meet these exigencies, we have provided a storage mechanism, indicated Q, in Fig. 5, upon which the plates P may be diverted and stacked, when the cross-conveyor is unclutched and ceases to operate to carry such plates from the machine. This storage device comprises a chain carrier constructed and operating in a manner similar to the feeding carrier at the front of the pickling apparatus, and hence detailed description thereof is not necessary. The plates will be unloaded from the conveyor C, and deposited by transfer as described, upon the cross-conveyor N, the latter now being at rest. An electro-magnetic transferring device O, constructed and operating in like manner to the loading transferrer at the front of the apparatus, picks up the plates resting singly upon the cross-conveyor and deposits them upon the storage device. When a stack of plates has been built up, the carrier is moved to allow the formation of another stack. A motor $M^3$, is employed to actuate the sprocket wheels $q$, of the storage carrier chain $q^1$, through the reducing gearing shown in Fig. 6.

The shaft $l^1$, has fixed thereon a gear $l^{21}$, intermeshing with a gear $l^{22}$, loose upon the shaft $l^{23}$, but adapted to be coupled thereto by clutch $5^c$, Fig. 6. A crank $l^{24}$, on the shaft $l^{23}$, through the link $l^{25}$, and crank $l^{26}$, oscillates the electro-magnets of the reciprocatory device O, to transfer the plates from the cross-conveyor to the storage device. After all of the plates have been unloaded from the pickling conveyor, the movement of the latter will be stopped. By reversing the motor $M^3$, the sprocket wheels $q$, may be driven to reverse the direction of movement of the storage carrier mechanism to bring such plates into position to be again transferred to the cross-conveyor, when the operation of the machines of the assembly is resumed, and permit the unloading of the plates from the storage carrier onto such cross-conveyor.

It is contemplated that the stacks which are being built upon the storage carrier Q, shall each contain a definite number of plates, and that when the stack has been completed by assembling the determined number of plates, the storage carrier shall be actuated to carry the stack away from the electro-magnets and bring an empty section of the carrier into position for the formation of another stack. Feeler devices have been provided for indicating the completion of the stack, the feeler devices being effective at such time to close an electric circuit and bring into operation the mechanism for moving the storage carrier, so that as the completed stack of plates is removed, an empty storage space on the storage carrier is brought into position to be filled by another stack. Likewise, feeler devices have been provided for use in connection with the reverse or unloading movement of the storage carrier, to indicate a movement of the storage carrier when the bottom plate of the stack has been transferred, and position another stack of plates for transfer to the cross-conveyor. These feeler devices act as circuit closers, as in the case of the feeler $g^{20}$, used in connection with the feeding mechanism at the front end of the machine.

Figs. 7, 8 and 9 illustrate in typical form a clutch which we use for transmitting movement to the various mechanisms described. The eccentric R, mounted so as to rotate loosely upon the shaft $r^1$, is constantly driven, and through an actuating link $r^2$, imparts a movement to the vibrator $r^3$, which latter is free to oscillate upon the shaft $r^4$, journalled in bearings $r^5$. The vibrator $r^3$, is provided with opposite lateral projections $r^6$ and $r^7$, designed to engage with interior projections $r^8$ and $r^9$, respectively, in a housing $r^{10}$, splined upon the said shaft $r^4$.

A centrally pivoted yoke lever $r^{11}$, is provided with projections $r^{12}$, which work in partly circumferential grooves $r^{13}$, on the exterior of the housing. The other end of the yoke lever is pivotally attached to a rod $r^{14}$, forming an extension of the core $s$, of a solenoid S. When freed from the force of the magnetic attraction, the core of the solenoid is actuated in a contrary direction by an expansion spring $s^1$, coiled thereon. The housing $r^{10}$ is moved longitudinally on the shaft $r^4$ in one direction by the solenoid when the latter is energized, and in the other direction by the spring $s^1$, upon deenergizing the solenoid. When moved by the solenoid, the projection $r^8$ of the housing is brought into the path of movement of the projection $r^6$, carried by the vibrator $r^3$. When moved by the action of the spring $s^1$, the projection $r^9$ is brought into the path of the projection $r^7$ of the said vibrator. An arm $r^{15}$ is keyed to the shaft $r^4$, and connected by a link $r^{16}$ to one arm of a bell crank $r^{17}$, the other arm of which actuates a double faced clutch member $r^{18}$, splined upon the shaft $r^1$. One bearing for the shaft $r^1$ is provided with a clutch face designed to be engaged by one of the faces of the clutch member $r^{18}$. The opposite clutch face of the member $r^{18}$ is designed to engage with a complemental clutch face formed on the hub of the gear $r^{19}$, which actuates the eccentric R, the said gear $r^{19}$ being loosely mounted upon the shaft $r^1$. A ring $r^{20}$, fixed upon the shaft $r^1$, serves to hold the gear $r^{19}$ and the eccentric in fixed position with relation to the other bearing for the shaft $r^1$, so that longitudinal movement of the said gear and eccentric is prevented.

When engagement of the projections $r^6$ and $r^8$ on the vibrator and the housing, respectively, is effected by the solenoid, the downward movement of the vibrator will rock the shaft $r^4$ and through the connections described move the clutch member $r^{18}$ into engagement with the hub of the gear wheel, and thus transmit motion to the shaft $r^1$, for the purpose which will hereafter be described. When the spring $s^1$ moves the housing $r^{10}$ so that the projection $r^9$ is in the path of movement of the projection $r^7$ of the vibrator, the upward movement of the latter will rotate the shaft $r^4$ in a contrary direction, and through the connections described will slide the clutch member $r^{18}$ into engagement with the fixed bearing for the shaft $r^1$ and hold the latter against rotation for the time being. The rod $r^{14}$ forms part of a circuit maker $s^2$, shown at the right in Fig. 9, the circuit being closed by movement of the rod $r^{14}$ under the influence of the solenoid, and broken by the spring $s^1$, which moves the said rod in the opposite direction. The purpose of this construction will be described later.

Having described the construction and operation of our new pickling machine, we will now describe the means which are employed to control the movements thereof.

The clutches $1^c$, $2^c$, $3^c$, $4^c$, $5^c$, the relative locations of which are shown in Fig. 6, are controlled by solenoids $1^s$, $2^s$, $3^s$, $4^s$, $5^s$, respectively, which are diagrammatically indicated at Fig. 10. These solenoids are energized at selected times to throw the clutches into and out of engaging position to start and stop the mechanisms the operations of which they control.

The clutches referred to control the operations of the principal operating mechanisms, namely, (1) the feeding or loading conveyor, (2) the main conveyor, (3) the unloading or delivery conveyor, (4) the cross conveyor, and (5) the storage carrier, respectively.

The apparatus will be provided with two electric current generators, indicated $G^{10}$ and $G^{20}$ in Fig. 10. The generator $G^{10}$ supplies a heavy current to the five principal mechanisms, above referred to. The generator $G^{20}$ is designed to supply the small current used to energize the solenoids which control the clutches and switches. The several principal mechanisms referred to are designed for joint operation, as well as for operation in groups comprising less than the whole number of such mechanisms. Thus, various operating combinations are rendered possible, whereby certain of the mechanisms may be operated while others are at rest. As showing the means whereby this variation in the order of operating the mechanisms is brought about, we refer to Fig. 10, at the upper left hand corner of which is indicated a series of switches, which through their connections operate to control various combinations of the mechanisms. When the circuit of which the switch $A^x$ forms a part is closed by the said switch, all of the five principal mechanisms in the apparatus will be positioned so as to operate at the proper times. When the circuit of which the switch $B^x$ is a part is closed, the main conveyor, the delivery or unloading conveyor and the cross-conveyor, will be in position to be operated at proper times. When the circuit of which the switch $C^x$ forms a part is closed, the main conveyor, the unloading conveyor and the storage carrier may be operated at the times desired. When the circuit of which the lever $D^x$ forms a part is closed, the cross conveyor and the storage carrier may be operated, the operation of the storage carrier in this combination being reversed, so that the plates which have accumulated or been stored upon the said carrier will be transferred back to the cross-conveyor, by means of which they will be carried into the assemblage of machines which perform the manufacturing operations. It will be understood that the switches $A^x$, $B^x$, $C^x$ and $D^x$, will be moved so that but a single one of the main control circuits is closed at one time, the particular circuit which is to be closed being determined by the conditions which call for the operation of all of the principal mechanisms or of any group or combination of such mechanisms at the time.

For instance, if the apparatus be in operation with all of the five principal mechanisms in position for action, and it is not desired at the time to feed a further supply of plates into the apparatus, switch $A^x$ will be thrown out so as to discontinue the movement of the feeding conveyor, and switch $B^x$ will be thrown in so that the main conveyor, and the unloading or delivering conveyor and the cross conveyor will operate until all of the plates in transit through the baths will have been fed to the assemblage of machine, in the manner before indicated. Other selective combinations of operative mechanisms may be produced by manipulating the switches in the desired order.

The switches just referred to serve merely to establish circuits which will be traversed by the electric current, so that the particular mechanisms included in the said circuits may be in position to be operated at the proper times. But all of such circuits are broken at other points, and at such points circuit closers are employed to complete the circuits and effect the operation of the mechanisms. The times of actuating such circuit closers to close the other breaks to complete the circuits, and effect the operation of the mechanisms controlled thereby, will be dependent upon the particular circumstances or conditions attending the operation of the pickling machine, and the means whereby this is brought about will now be described.

We will assume that a stack of plates P has been presented by the feeding or loading mechanism G to the action of the electro-magnetic transferring devices I, which latter are to be actuated to transfer the plates to the hooks of the main conveyor, in the manner hereinbefore described. Upon throwing the switch $A^x$, the main circuit to the generator $G^{20}$ is completed, the solenoids $1^s$, etc., in the said circuit, are energized, and the switches of certain of the auxiliary circuits controlled by the action of the solenoids are closed. The magnets $I^2$ of the electro-magnetic transferring devices I, are included in auxiliary circuit $ax$ which is open at three places, and is bridged by three switches indicated 20, 21 and 22, when the latter are closed at the same time. Solenoid $1^s$ maintains contact at switch 20 for the whole of the time that the main circuit is closed by the switch $A^x$. Switches 21 and 22 are three-way switches of well known type, and are thrown alternately by the oscillation of the levers $i^1$ which carry the electro-magnets $I^2$. These switches 21 and 22 energize and deenergize the said electro-magnets. As the oscillating arms carrying the electro-magnets bring the latter into contact with the uppermost plate in the stack P, an adjustable stop $i^{12}$ on the arm $i^1$ contacts with the push pin of the switch 21 and closes the circuit to energize the magnets, the connected branch of the circuit having previously been closed by the switch 22. The magnets are now moved through their arcuate path to deposit the plate taken from the stack P, upon the hooks $d^7$ of the main conveyor. As the end of this movement is reached, an adjustable stop $i^{13}$ on the opposite side of the arm $i^1$ contacts with the push pin of the switch 22 and breaks the circuit, thus deenergizing the magnets and releasing the plate to permit it to lie in position upon the hooks of the main conveyor. The magnets then return to take another plate from the stack P and in so doing, the switch 21 is operated in the manner described to close the circuit and energize the electro-magnets which are now in contact with the plate to be transferred. This operation is repeated until all of the plates in the stack P have been delivered to the main conveyor.

When the last plate of the stack has been removed, the feeding or loading conveyor G is operated to present another stack of plates in position to be transferred, as before. Auxiliary circuit $bx$ controls the movement of the feeding conveyor G. The solenoid $1^s$ has already closed the switch 23 in this auxiliary circuit, as previously described. A spring pressed pivoted feeler finger $g^{20}$, Fig. 11, is raised by an expansion spring $g^{21}$ into the space previously occupied by the stack of plates. This movement of the feeler finger $g^{20}$ acts to throw the switch 25 forming a part of branch circuit $bx^1$, of which circuit the solenoid $6^s$ forms a part. A cam $i^{14}$ on the shaft $I^1$ throws the switch 24 in branch circuit $bx^2$, after the electro-magnets have started on their movement to transfer the last plate from the stack, and have raised the said plate to a point where it will be clear of the standards $g^3$, $g^4$ of the loading conveyor G, in the movement of the carrier to position another stack of plates. The current now flows to the solenoid $6^s$, which throws the switch 26 to close the circuit leading from the generator $G^{10}$ to the motor $M^2$, whereby the latter is operated to move the feeding carrier the required distance to position another stack of plates P for action by the electro-magnetic transferring device I. Upon the movement of the new stack of plates into position the spring pressed feeler finger $g^{20}$ is depressed, without disturbing the electrical contact of switch 25. At the time that the stack of plates has been brought into position by the carrier, a timing switch cam $g^{25}$ throws the switch 27 and breaks the circuit through branch $bx^1$ and makes a contact through branch circuit $bx^3$. The solenoid $6^s$ is deenergized, and the motor $M^2$ ceases to operate. The timing cam $g^{25}$ is shown as a two point cam, and is intended to make one-half revolution during the time that the plates of a stack are being transferred, but it is obvious that such timing cam may have a larger or smaller number of operating points, and be given a speed of rotation to correspond to the number of such points. Cam $i^{14}$ on the shaft of the electro-magnetic transferring device I, will be provided with a concentric acting surface of sufficient length to maintain a simple contact at switch 24 from the time the last plate has cleared the standards $g^3$ and $g^4$, until the plate has been deposited upon the hooks of the main conveyor, and the timing cam $g^{25}$, has completed its movement of rotation or partial rotation, as the case may be.

When the last plate has been removed from the second stack, the spring pressed lever $q^{20}$ will act to throw the switch 25 into the branch circuit $bx^3$, and when such last plate has cleared the standards, the cam $i^{14}$ will complete the circuit as before, and the motor $M^2$ will be operated to present another stack of plates. The operations described will continue as the plates of the successive stacks upon the carrier G are transferred to the main conveyor.

The electro-magnetic transferring devices L, employed to transfer the plates from the support K to the cross-conveyor N operate in a manner the same as that described with reference to the feeding transfer devices I. Solenoid $3^s$ has closed the switch 28 of the auxiliary circuit $cx$, which circuit embraces two alternately acting three-way switches 29 and 30, which latter are operated by the oscillating arms which carry the electro-magnets $L^2$. The auxiliary circuit $cx$, and the said oscillating arms, being the same in all particulars as the previously described auxiliary circuit $ax$, with the several switches operating in the same manner, do not need to be further described with reference to their construction.

The electro-magnetic transferring devices O, which are employed to transfer the plates deposited upon the cross-conveyor N, to the storage carrier Q, is constructed so as to have capability of operation in both directions, one of such operations being for the purpose of storing the plates transferred from the pickling machine, at such times as it is inexpedient to permit the cross-conveyor to convey the plates to the machine assemblage. The circumstances under which this contingency may arise have been hereinbefore pointed out. The other movement of the electro-magnetic transferring devices of the storage carrier is the reverse of that just described, at which time the plates stacked upon the storage carrier will be unloaded from such carrier and deposited singly upon the cross-conveyor, to be fed into the machine assemblage.

Under such contingencies, solenoids, $2^s$, $4^s$ and $5^s$ will be energized by throwing the proper switch lever, of the $A^x$—$D^x$ series. Solenoids $2^s$ and $4^s$ will close the switches 31 and 32, respectively, to establish the auxiliary circuit $dx$, in which circuit the electro-magnets $O^2$ of the transferring devices O, are included. The arms which carry the electro-magnets $O^2$ operate three-way switches 33 and 34 in the manner previously described with reference to the electro-magnets $I^2$, to energize the electro-magnets $O^2$ through the switch 33, and carry the plates from the cross-conveyor and deposit them in stacks upon the storage conveyor. The magnets are deenergized at the end of the movement by the switch 34, as before.

When plates to the required number have been placed in a stack upon the storage carrier, a pivoted feeler device $g^{26}$, will throw the three-way switch 35 and establish a current through branch circuit $dx^1$, to energize the solenoid $7^s$, to throw switch 36, to operate the motor $M^3$ of the storage pile conveyor, to carry the completed stack to the rear, in the direction indicated by the arrow, and provide space on the carrier for the formation of another stack of plates. A timing cam $g^{27}$, similar in construction and operation to the previously described timing cam $g^{25}$, operates a three-way switch 37 in the branch circuit $dx^1$, to break the circuit when the storage carrier has completed its movement in the outward direction.

When the plates stored in stacks upon the storage carrier are to be returned to the cross-conveyor N, for feeding into the machine assemblage, the solenoids $4^s$ and $5^s$ will remain energized, but the solenoid $2^s$ will be deenergized, and the switch 31 will be operated by the spring-actuated core of the solenoid $2^s$, to make contact with the lower branch $dx^2$ of the circuit $dx$. The electro-magnets $O^2$ will then be energized by the switch 34, to seize a plate upon the stack to be returned to the cross-conveyor, and be deenergized by the switch 33. A spring actuated pivoted feeler finger $g^{22}$, similar in construction and operation to the previously described feeler device $g^{20}$, will throw the three-way switch 38 in the branch circuit $dx^3$, leading to the solenoid $8^s$, which operates the switch 39 to impart a reverse rotation to the motor $M^3$, which actuates the storage carrier. The break in branch circuit $dx^4$ is closed at switch 40, by the solenoid $5^s$.

Switch 41 in the said circuit, is closed by the concentric cam $l^{15}$ on the shaft which carries the arms of the electro-magnetic devices $O^2$. The cam $l^{15}$ is patterned after the cam $i^{14}$, previously described, and is designed to operate the switch 41 after the plate lifted by the electro-magnets has cleared the standards of the storage carrier, and to maintain the contact during the time that the motor $M^3$ is operating to move another stack of plates into position to be transferred. At the termination of this movement, the timing cam $g^{27}$ will act to throw the switch 42 and break the circuit leading to the solenoid $8^s$, whereupon the latter will be deenergized and the motor $M^3$ will cease its rotation.

Switches 43 and 44 are operated by solenoids $3^s$ and $4^s$, respectively, so as to complete the branch circuit $dx^4$ which controls the forward movement of the motor $M^3$. When the solenoids $3^s$ and $4^s$ are deenergized the switches will change and send the current through the branch circuit $dx^5$, to energize the solenoid $7^s$, which controls the reverse movement of the motor.

In Fig. 13 we have shown the hook of special form which we employ in our construction for conveying the plates through the pickling apparatus. At the inside the hook is provided with a projection $d^8$, against which the plate will rest, the bottom of the plate being supported in the neck of the hook. The inside of the point of the hook is also provided with an opposing projection $d^9$. From this construction, it will be seen that the plate, when supported by the conveyor, contacts with the hooks only at minute points, so as to leave the surfaces of the plate free for action thereon by the chemicals and liquids of the several baths.

Modifications in the form in which the invention is shown as embodied, and obvious uses other than herein stated, may be made without departing from the spirit thereof.

Having thus described our invention, what we claim and desire to secure by Letters Patent of the United States, is:

1. In an apparatus for pickling metal plates or blanks, a line of vats, in combination with a conveyor provided with depending supports to carry the plates or blanks through the vats, means to feed the plates or blanks to the conveyor, and means to deliver the plates at the end of their travel.

2. In an apparatus for pickling metal plates or blanks, a line of vats, in combination with an endless conveyor, means thereon to support the plates or blanks in their passage through the vats, means for supporting the conveyor in a line of travel above the vats, means to feed the plates or blanks to the conveyor at one end of the line of vats, and means to deliver them from the conveyor at the other.

3. In an apparatus for pickling metal plates or blanks, a line of vats, in combination with a conveyor supported for travel in a plane above the vats to pass the plates or blanks through the vats, a transferring device to feed the plates to the conveyor at one end of the line of vats, and a transferring device to deliver the plates from the conveyor at the other end.

4. In a pickling apparatus, a line of vats, a main conveyor for supporting metal plates or blanks in their passage through the vats, devices for feeding the plates or blanks to the main conveyor, a cross conveyor and devices adapted to move varying distances for delivering the plates or blanks from the main conveyor to the cross conveyor.

5. In a pickling apparatus, a line of vats, a conveyor provided with depending hangers for supporting metal plates or blanks in their passage through the vats, and devices for feeding the plates or blanks to the conveyor.

6. In a pickling apparatus, a line of vats, a conveyor provided with depending hangers for supporting metal plates or blanks in their passage through the vats, and devices for delivering the plates or blanks from the conveyor at the end of their travel through the vats.

7. In a pickling apparatus, a line of vats, a conveyor for supporting metal plates or blanks in their passage through the vats, and an electro-magnet device for delivering the plates or blanks from the conveyor at the end of their travel through the vats.

8. In a pickling apparatus, a line of vats, a main conveyor for supporting metal plates or blanks in their passage through the vats, a cross-conveyor for receiving the plates or blanks from the main conveyor, and an electro-magnetic device for transferring the plates or blanks from the main conveyor to the cross-conveyor.

9. In a pickling apparatus, a succession of vats to contain the solutions employed in pickling metal plates or blanks, a main conveyor to support the plates or blanks in their movement through the vats, a storage conveyor to hold the accumulation of plates discharged from the main conveyor, and means for transferring the plates or blanks to the storage conveyor.

10. In a pickling apparatus, a series of vats to contain the solutions employed in pickling metal plates or blanks, a conveyor to carry the plates or blanks through the vats, devices to feed the conveyor, devices to deliver the plates or blanks from the conveyor, devices to remove from the apparatus the plates or blanks so delivered, and means under selective control to operate said conveyor and devices.

11. In a pickling machine having suitable baths, a support for a stack of metal plates, a conveyor for immersing the plates in the baths, and a reciprocating device adapted to move varying distances as the height of the stack decreases for transferring the plates from the stack to the conveyor.

12. In a pickling machine having suitable baths, a support for a stack of metal plates, a conveyor for immersing the plates in the baths, a device for transferring the plates singly from the stack to the conveyor, and means rendered operative by the transfer of the last plate of the stack to bring another stack into transfer position.

13. In a pickling machine provided with devices for immersing metal plates, a support for a plural number of stacks of plates, means for transferring the plates of the leading stack to the pickling devices, devices controlled by the transfer of the last plate of such leading stack to effect the movement of the next stack into leading position for the transfer of the plates thereof.

14. In a pickling machine, a pickling conveyor, a feeding conveyor for supporting a plurality of stacks of metal plates, in combination with means for transferring the plates singly from the leading stack to the pickling conveyor, and devices rendered operative by the transfer of the last plate of the leading stack to advance the next stack into leading position.

15. In a pickling machine, a main conveyor for immersing metal plates, a feeding conveyor for supporting a plurality of stacks of plates, devices for transferring the plates singly from the feeding conveyor to the main conveyor, and means rendered operative by the transfer of the plates of one of the stacks to actuate the feeding conveyor to position another stack of plates for the action of the transferring devices.

16. In a pickling machine, pickling mechanism, a movable feeding conveyor adapted to support a plurality of stacks of plates, means for transferring the plates singly from the leading stack upon the support to the pickling mechanism, and means to successively move the feeding conveyor to advance the several stacks supported thereon to the leading position.

17. In a pickling machine, a line of baths, an endless conveyor for supporting metal plates in separated vertical positions while immersed in the baths, in combination with electro-magnetic devices for supplying the plates singly to the conveyor.

18. In a pickling machine, a line of baths, an endless conveyor provided with depending supports for maintaining a plurality of plates in separated vertical positions while being pickled, in combination with devices for feeding the plates to the said conveyor.

19. In a pickling machine, a line of baths, and an endless conveyor operating in a plane above the baths and having a series of depending hangers for supporting metal plates in separated relation while being passed through the baths, in combination with feeding devices adapted to engage the plates singly with the said hangers.

20. In a pickling machine, an endless conveyor movable therein for supporting metal plates during the pickling operation, in combination with a relatively stationary transferring device adapted to move varying distances, and means for actuating the said transferring device to present plates to the said conveyor.

21. In a pickling machine, an endless conveyor movable therein for supporting metal plates in vertical position while being pickled, in combination with a relatively stationary transferring device, and means for actuating the latter to deliver the plates from the conveyor at the conclusion of the pickling operation.

22. In a pickling machine, a line of baths, an endless conveyor for supporting metal plates in vertical position while the latter are traversing the baths, in combination with a relatively stationary device at one end of the machine for feeding the plates to the said conveyor, a relatively stationary device at the other end of the machine for delivering the plates from the conveyor at the conclusion of the pickling operation, and means for actuating the said feeding and delivering devices.

23. In a pickling machine, a pickling conveyor provided with devices for supporting a plurality of plates in separated vertical positions while subjected to the pickling operation, in combination with co-acting means for supplying the plates singly to the said supporting devices.

24. In a pickling machine, an endless conveyor movable in a plane above the baths, and hangers depending from the said conveyor for supporting the plates in separated vertical positions during the pickling operation, the said hangers being provided with points for contacting with opposite sides of the plate, whereby all the areas of the latter are free to the action of the pickling solutions.

25. In a pickling machine, a line of baths, an endless conveyor operating in a plane above the baths and provided with devices for supporting a plurality of metal plates in separated vertical positions while immersed in the baths, in combination with devices to deliver the plates from the conveyor at the end of their line of travel through the baths.

26. In a pickling machine, pickling mechanism, means for supporting a stack of plates in position for transfer to the pickling mechanism, devices for effecting such transfer, and means for advancing another stack of plates into transfer position after transfer of the plates of the first stack has been effected.

27. In a machine for pickling metal plates, a traveling conveyor for carrying the plates through the pickling solutions, the said conveyor being provided with depending hangers for supporting the plates, in combination with delivering mechanism to remove the plates from the hangers at the conclusion of the pickling operation.

28. In a machine for pickling metal plates, a pickling vat, a conveyor traveling in a plane outside of the vat, the said conveyor having depending hangers for supporting the plates during their movement through the vat, in combination with delivery mechanism adapted to remove the plates from the hangers at the conclusion of the pickling operation.

29. In a machine for pickling metal plates, a traveling conveyor provided with depending hangers for supporting the plates during the pickling operation, in combination with feeding devices adapted to present the plates to the said hangers, and delivery devices adapted to remove the plates from the hangers at the conclusion of the pickling operation.

30. In a machine for pickling metal plates, a pickling vat, a traveling conveyor moving in a plane outside of the vat, the said conveyor being provided with depending hangers for supporting the plates during their immersion in the said vat, in combination with feeding devices to supply the plates singly to the said hangers, and delivery devices adapted to remove the plates from the hangers at the conclusion of the pickling operation.

31. In a machine for pickling metal plates, a pickling vat, a traveling conveyor provided with depending hangers for supporting the plates during their passage through the vat, in combination with automatic means for presenting the plates singly to the hangers, and automatic means for delivering the plates from the hangers at the conclusion of the pickling operation.

32. In a machine for treating metallic substances, a tank containing a solution, an endless conveyor moving over the tank and provided with depending hangers for supporting the metallic substances while the latter are passing through the solution.

33. In a machine for treating metallic substances, a tank containing a solution, and an endless conveyor moving ever the tank and provided with hangers for supporting the metallic substances while the latter are being treated, in combination with means having a movement of rotation toward the conveyor to feed the substances to be treated to the conveyor.

34. In a machine for treating metallic substances, a tank containing a solution, an endless conveyor provided with depending hangers for supporting the metallic substances while the latter are being treated, and means for automatically feeding the metallic substances to the hangers.

35. In a machine for treating metallic substances, a tank containing a solution, an endless conveyor provided with hangers for supporting the said substances in the solution while being treated, means for feeding the metallic substances to the conveyor, and means for delivering the same therefrom.

36. In a machine for treating metallic substances, a tank containing a solution into which the said substances are to be immersed, an endless conveyor provided with hangers for supporting the said substances while passing through the solution, and means for automatically unloading such metallic substances from the machine.

37. In an apparatus for treating articles, a container for solution, an endless conveyor having a normal plane of movement, means for supplying the articles to the conveyor, and means for diverting the conveyor from the normal plane of its movement to immerse the articles in the solution.

38. In an apparatus for treating articles, a container for a solution, and a conveyor operating in a normal plane over the container, in combination with means for diverting the conveyor from its normal plane of movement to immerse the articles in the solution.

39. In an apparatus for treating articles, a container for the solution by means of which the articles are treated, a conveyor operating in a normal plane over the container, automatically operating devices for feeding the articles to the conveyor prior to treatment and for delivery therefrom upon completion of such treatment, in combination with means for diverting the articles from the normal plane of movement of the conveyor for immersion in the solution.

In testimony whereof, we have signed our names at Milwaukee, this 30th day of January, 1920.

R. STANLEY SMITH.
E. W. BURGESS.

Witnesses:
W. F. Woolard,
C. Theo. Osterberg.

DISCLAIMER.

1,428,716.—*Reuben Stanley Smith* and *Edward W. Burgess*, Milwaukee, Wis. MACHINE FOR PICKLING METAL PLATES AND BLANKS. Patent dated September 12, 1922. Disclaimer filed September 25, 1922, by the assignee, *A. O. Smith Corporation.*

Hereby enters this disclaimer to that part of the claims in the said specification, which is in the following words, to wit—

"24. In a pickling machine, an endless conveyor movable in a plane above the baths, and hangers depending from the said conveyor for supporting the plates in separated vertical positions during the pickling operation, the said hangers being provided with points for contacting with opposite sides of the plate, whereby all the areas of the latter are free to the action of the pickling solutions.

"32. In a machine for treating metallic substances, a tank containing a solution, an endless conveyor moving over the tank and provided with depending hangers for supporting the metallic substances while the latter are passing through the solution.

"38. In an apparatus for treating articles, a container for a solution, and a conveyor operating in a normal plane over the container, in combination with means for diverting the conveyor from its normal plane of movement to immerse the articles in the solution."

[*Official Gazette October 3, 1922.*]